US006690158B2

United States Patent
Saito et al.

(10) Patent No.: US 6,690,158 B2
(45) Date of Patent: Feb. 10, 2004

(54) POSITION SENSOR FOR ELECTROMAGNETIC ACTUATOR TO DETECT A POSITION OF A SHAFT (75) Inventors: Kiyoshi Saito, Osaka (JP); Shinjiro Ueda, Osaka (JP); Akira Matsuura, Osaka (JP); Yasunori Matsukawa, Fukui (JP); Noriyuki Jitosho, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/089,672

(22) PCT Filed: Aug. 6, 2001

(86) PCT No.: PCT/JP01/06729
§ 371 (c)(1),
(2), (4) Date: Aug. 27, 2002

(87) PCT Pub. No.: WO02/12824
PCT Pub. Date: Feb. 14, 2002

(65) Prior Publication Data
US 2003/0030958 A1 Feb. 13, 2003

(51) Int. Cl.$^7$ .................... G01B 7/14; G01B 7/30
(52) U.S. Cl. .................... 324/207.21; 324/207.24
(58) Field of Search .............. 324/207.21, 207.24, 324/207.2, 207.22, 260, 252; 123/368, 614; 338/32 R (56) References Cited

U.S. PATENT DOCUMENTS

| | | | |
|---|---|---|---|
| 4,079,360 A | | 3/1978 | Ookubo et al. |
| 4,924,696 A | * | 5/1990 | Schroeder et al. .......... 73/118.1 |
| 5,570,015 A | * | 10/1996 | Takaishi et al. ....... 324/207.21 |
| 6,435,169 B1 | * | 8/2002 | Vogt ...................... 123/568.23 |

FOREIGN PATENT DOCUMENTS

| | | |
|---|---|---|
| GB | 1 416 940 | 12/1975 |
| JP | 57-74612 | 5/1982 |
| JP | 58-129106 | 9/1983 |
| JP | 59-58305 | 4/1984 |
| JP | 1-203901 | 8/1989 |
| JP | 1-173636 | 12/1989 |
| JP | 5-172504 | 7/1993 |
| JP | 5-280916 | 10/1993 |
| JP | 8-145611 | 6/1996 |
| JP | 10-52019 | 2/1998 |
| JP | 11-215795 | 8/1999 |
| JP | 11-281308 | 10/1999 |
| JP | 11-299269 | 10/1999 |
| JP | 2000-292113 | 10/2000 |
| JP | 2001-221653 | 8/2001 |

OTHER PUBLICATIONS

International Search Report corresponding to application No. PCT/JP01/06729 dated Nov. 6, 2001.
English translation of Form PCT/ISA/210.
European Search Report dated Aug. 5, 2003 (3 pages).
European Search Report dated Aug. 5, 2003 (3 pages), EP23804–50.

* cited by examiner

Primary Examiner—N. Le
Assistant Examiner—Subhash Zaveri
(74) Attorney, Agent, or Firm—RatnerPrestia (57) ABSTRACT

A position sensor includes a shaft to be detected, a first magnet being fixed to the shaft and having a first polarity vector parallel to an axis of the shaft, a second magnet being disposed opposite to the first magnet and having a second polarity vector crossing the first polarity vector substantially orthogonally three-dimensionally, and first and second semiconductor magnetoresistive elements being disposed over the second magnet and functioning as a magnetoelectric transducer having a magnetosensitive axis substantially orthogonal to the first and second polarity vectors. The first and second elements generate an output responsive to an axial movement of the shaft.

8 Claims, 9 Drawing Sheets

Prior Art

Fig. 7 (b)

Prior Art

Fig. 7 (c)

Prior Art

POSITION SENSOR FOR ELECTROMAGNETIC ACTUATOR TO DETECT A POSITION OF A SHAFT

THIS APPLICATION IS A U.S. NATIONAL PHASE APPLICATION OF PCT INTERNATIONAL APPLICATION NO. PCT/JP01/06729.

TECHNICAL FIELD

The present invention relates to a position sensor for an electromagnetic actuator which is used in various systems for a vehicle and detects a position of a shaft to be detected which moves axially in synchronization with a movable shaft of the electromagnetic actuator.

BACKGROUND ART

To meet recently-increasing requirement for improving fuel efficiency of a vehicle, various measures directed toward the improvement of the fuel efficiency have been studied. Among them, a high voltage of a battery enables an electromagnetic actuator such as a linear solenoid or the like to have both a great driving force and miniaturization. Consequently, the electromagnetic actuator, which having a higher efficiency to various kinds of electronics systems than a mechanical actuator, has been studied. In order to apply the electromagnetic actuator to these electronics systems, the position of a movable shaft must be controlled accurately. Accordingly, a position sensor becomes important for the accurate position detection of the movable shaft.

Figure 7:
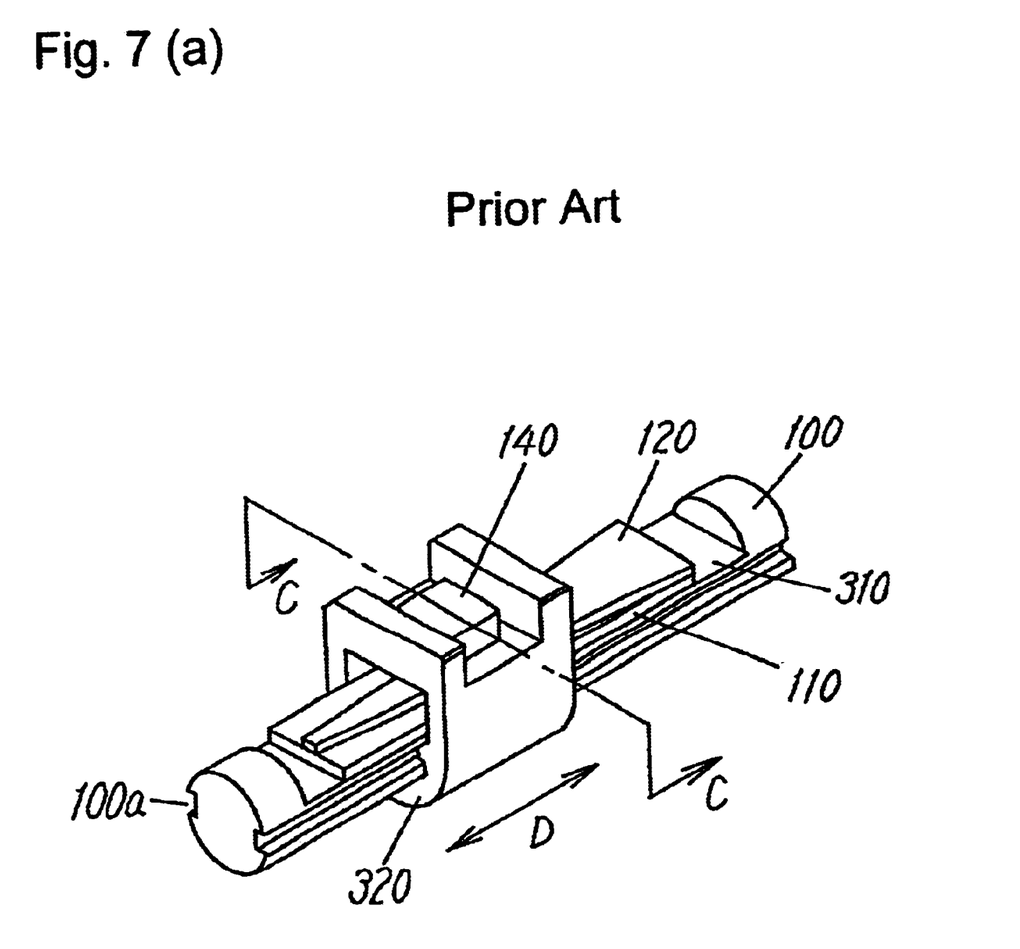
FIG. 7(a) is a perspective view of a conventional position sensor for the electromagnetic actuator.
FIG. 7(b) is a cross section taken along an arrow C—C of the sensor.
FIG. 7(c) is a perspective view detailing a relationship between a magnetoelectric transducer and a magnetic field generator of the sensor.

With reference to FIG. 7, a conventional position sensor (disclosed in Japanese Patent Laid-Open No. 5-264326) for the electromagnetic actuator will be hereinafter described.

FIG. 7(a) is a perspective general view of the conventional position sensor for the electromagnetic actuator.

FIG. 7(b) shows a cross section taken along arrow C—C of the sensor.

FIG. 7(c) is a perspective view detailing a relationship between a magnetoelectric transducer and a magnetic field generator of the sensor.

In FIGS. 7(a), 7(b) and 7(c), reference numeral 100 denotes a shaft to be detected. Reference numeral 100a denotes a guide groove formed in a longitudinal direction of the shaft 100. Reference numeral 110 denotes a magnet 110 polarized magnetically in a thickness direction. Reference numeral 120 denotes a magnetic plate made of a permalloy shaped like an isosceles triangle. Reference numeral 130 denotes a magnetic field generator including the magnet 110 and the magnetic plate 120 attached together in their respective longitudinal direction matching together. Reference numeral 140 denotes a magnetoelectric transducer. Reference numeral 310 denotes a flat surface of the shaft 100. Reference numeral 320 denotes a slider including an insulating material engages with the guide groove 100a, for sliding smoothly relative to the shaft 100. The magnetoelectric transducer 140 provided at the slider 320 is mounted in parallel with the magnetic field generator 130 provided on the flat surface 310 of the shaft 100.

An operation of the conventional sensor will be explained below.

The shaft 100 is displaced relative to the slider 320 (in the direction of an arrow D in FIG. 7(a)), the magnetic plate 120 is opposed to the magnetoelectric transducer 140 accordingly with various widths. Consequently, an electric field sensed by the magnetoelectric transducer 140 varies in strength accordingly, thus enabling the sensor to detect the position of the shaft 100.

The conventional position sensor described above, however, has the following problem. The conventional position sensor for the electromagnetic actuator has a contacting portion functioning as a guide for preventing the magnetoelectric transducer 140 from rotating about an axis of the magnetic field generator 130. The sensor, if being used over a long period of time, has the contacting portion wearing unevenly and causing backlash, which makes the sensor generate an unstable output.

DISCLOSURE OF THE INVENTION

The present invention addresses the problem discussed above and aims to provide a position sensor for an electromagnetic actuator. The position sensor is capable of accurate non-contacting position detection, not restricting rotation of a shaft to be detected about an axis of the shaft.

To solve this problem, the position sensor of the present invention includes: a first magnet being fixed to the shaft to be detected which moves axially in synchronization with a movable shaft of the electromagnetic actuator, and having a first polarity vector parallel to the axis of the shaft; a second magnet being disposed opposite to the first magnet and having a second polarity vector crossing the first polarity vector substantially orthogonally three-dimensionally; and a magnetoelectric transducer being disposed over the second magnet and having a magnetosensitive axis substantially orthogonal to the first and second polarity vectors. The magnetoelectric transducer generates an output responsive to an axial movement of the shaft. With this configuration, the position sensor for the electromagnetic actuator can detects the position accurately with no contact, not restricting the rotation of the shaft about the axis of the shaft at all.

BRIEF DESCRIPTION OF THE DRAWINGS

FIG. 6(a) schematically illustrates a relationship between an operation of the position sensor and an output voltage in accordance with the embodiment, and FIG. 6(b) schematically illustrates a relationship between the operation of the sensor and an output voltage after a change in temperature.

BEST MODE FOR CARRYING OUT THE INVENTION (Exemplary Embodiment 1)

Figure 1:
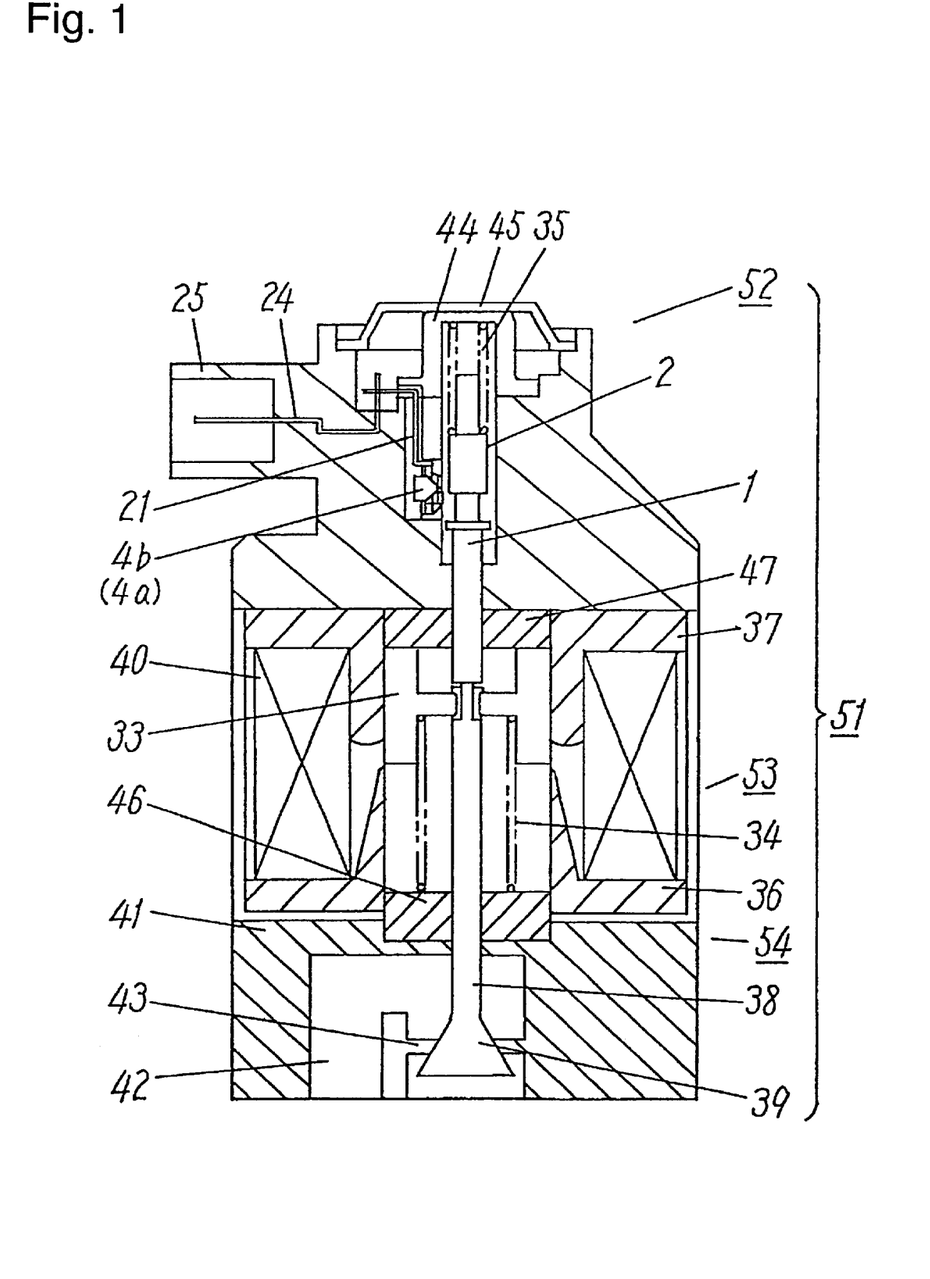
FIG. 1 is a sectional view of an electric EGR valve including a position sensor for an electromagnetic actuator in accordance with an exemplary embodiment of the present invention.
Figure 2:
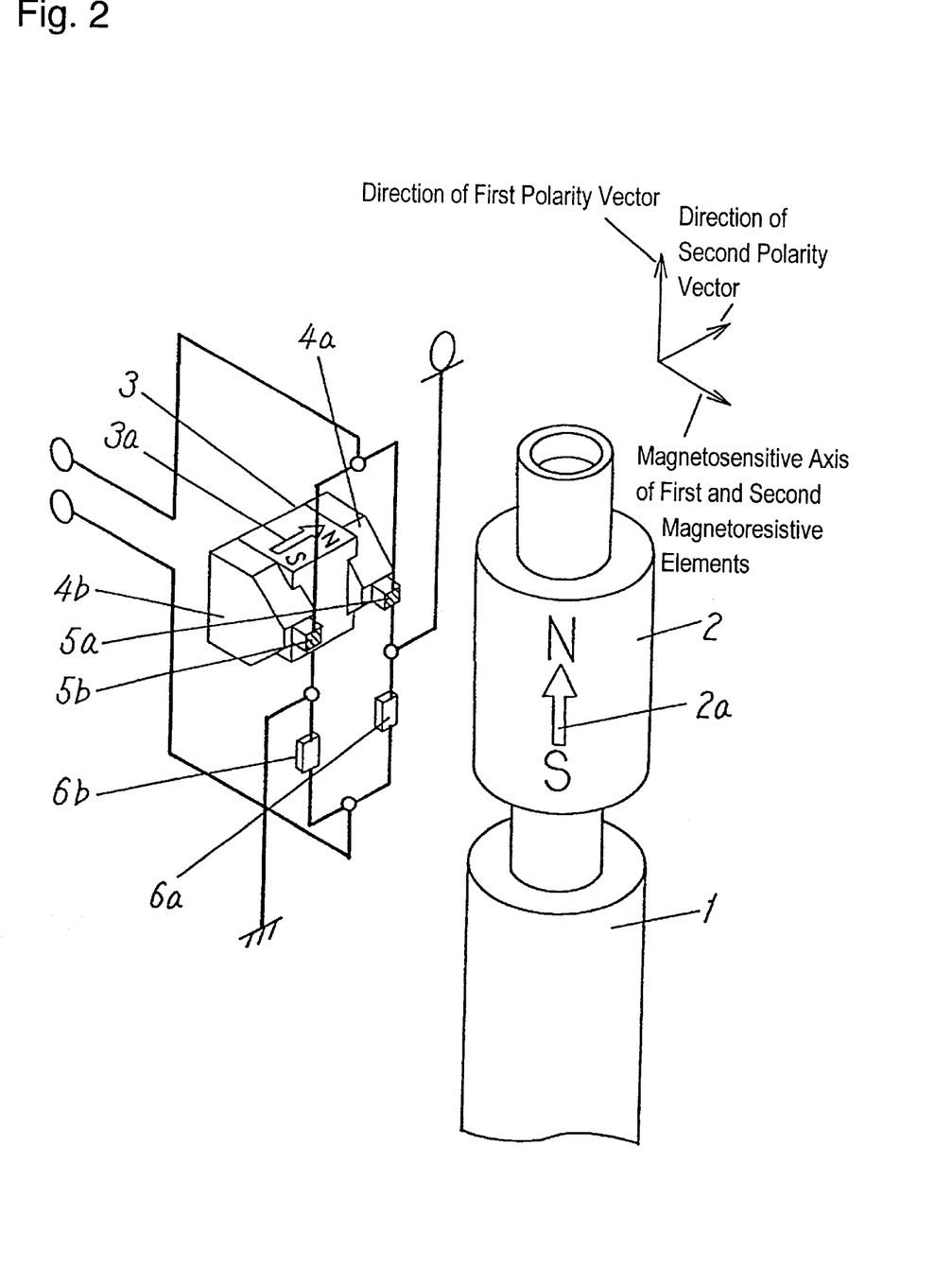
FIG. 2 is a perspective view illustrating a principle of the position sensor in accordance with the embodiment.
Figure 3:
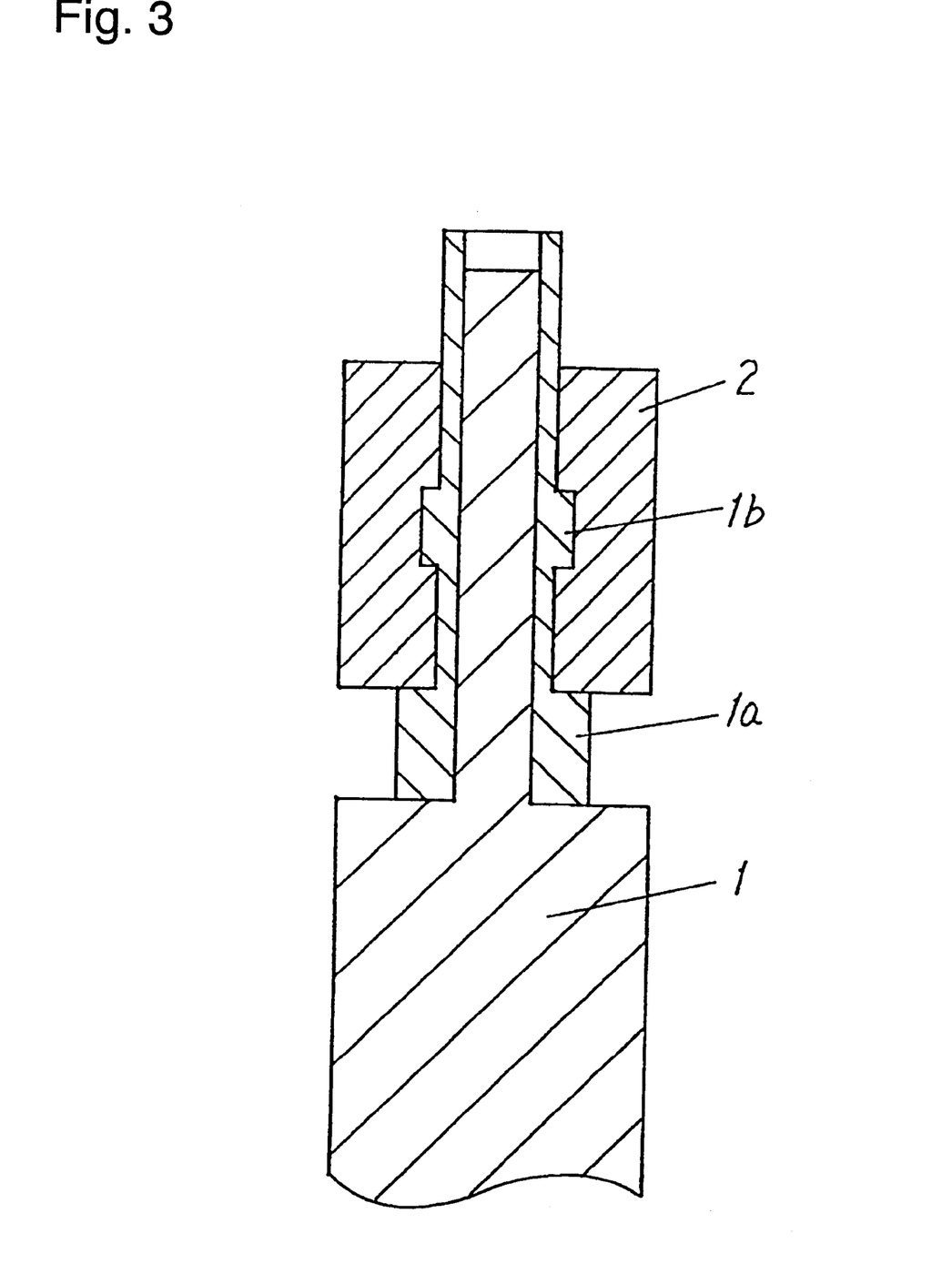
FIG. 3 is a sectional view illustrating a first magnet fixed to a shaft to be detected in accordance with the embodiment.
Figure 4:
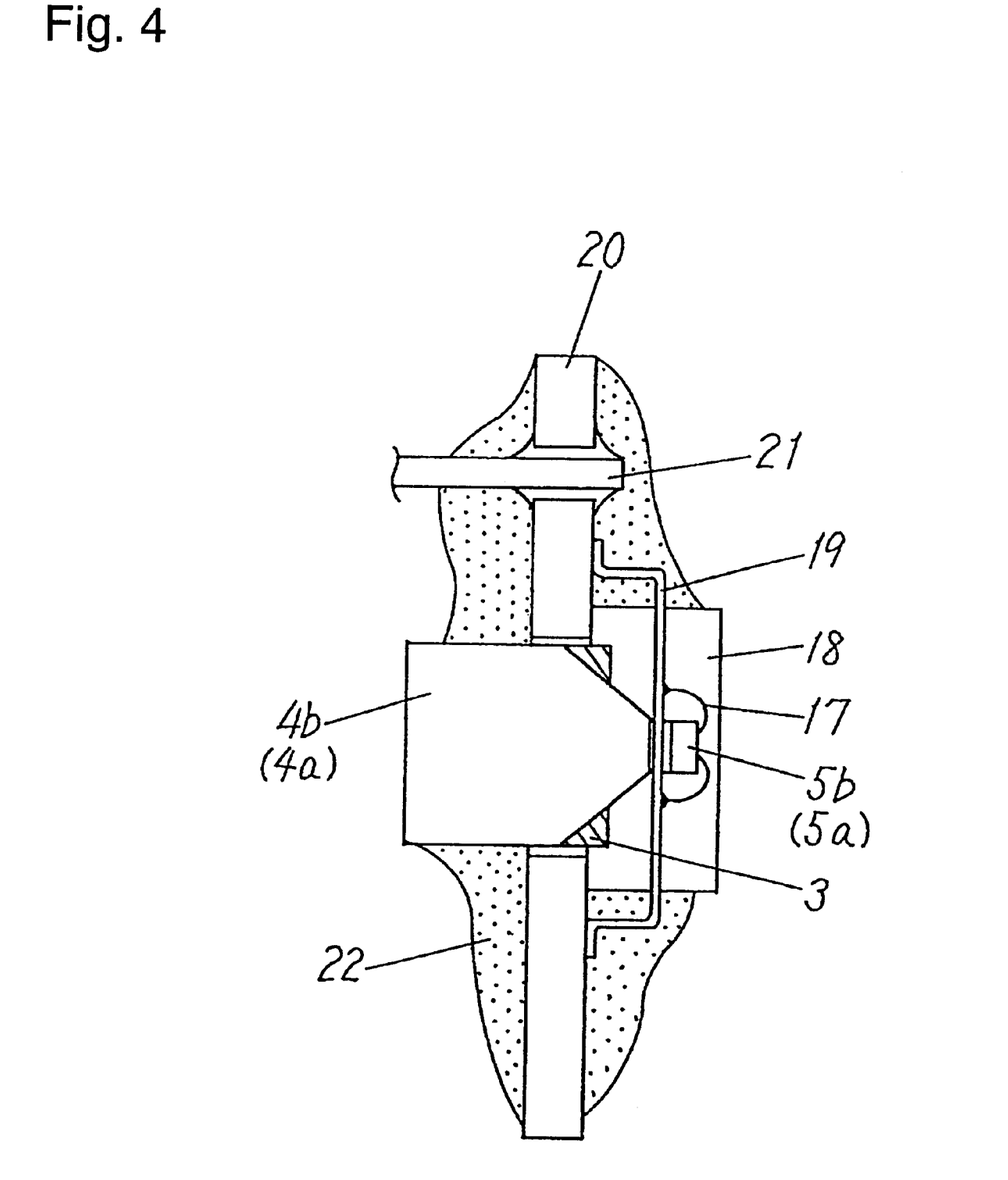
FIG. 4 is a cutaway view of an essential part of the position sensor in accordance with the embodiment.

FIG. 1 is a sectional view of an electric EGR valve including a position sensor for an electromagnetic actuator in accordance with the exemplary embodiment of the present invention. FIG. 2 is a perspective view illustrating a principle of the position sensor in FIG. 1. FIG. 3 is a sectional view illustrating a first magnet fixed to a shaft to be detected in FIG. 2. FIG. 4 is a cutaway view of an essential part of the position sensor in FIG. 1.

In FIGS. 1 to 4, reference numeral 1 denotes a shaft to be detected which is shaped like a round bar and is made of non-magnetic stainless steel such as austenitic heat-resisting steel (e.g. JIS-listed SUH-31B) or the like. Reference numeral 2 denotes a cylindrical first magnet made of SmCo rare earth magnet and being attached to the shaft 1 coaxially with the shaft 1. Reference numeral 2a denotes a first polarity vector indicating a direction of the magnetic polarity of the first magnet 2. Reference numeral 3 denotes a second magnet made of SmCo rare earth magnet. Reference numeral 3a denotes a second polarity vector indicating a direction of magnetic polarity of the second magnet 3. Reference numerals 4a and 4b denote first and second magnetic flux collecting yokes, respectively. Reference numerals 5a and 5b denote first and second semiconductor magnetoresistive elements, respectively. Reference numerals 6a and 6b denote first and second fixed resistors, respectively. Reference numeral 17 denotes a gold wire. Reference numeral 18 denotes a molded case. Reference numeral 19 denotes a lead frame. Reference numeral 20 denotes a relay board. Reference numeral 21 denotes a relay terminal. Reference numeral 24 denotes a connector terminal. Reference numeral 25 denotes a connector. Reference numeral 33 denotes an armature. Reference numerals 34 denotes a first return spring. Reference numeral 35 denotes a second return spring. Reference numeral 36 denotes a first stator. Reference numeral 37 denotes a second stator. Reference numeral 38 denotes a shaft. Reference numeral 39 denotes a valve. Reference numeral 40 denotes an annular coil. Reference numeral 41 denotes a valve base. Reference numeral 42 denotes a recirculation passage. Reference numeral 43 denotes a valve seat. Reference numeral 44 denotes an inner cover. Reference numeral 45 denotes an outer cover. Reference numeral 46 denotes a first bearing. Reference numeral 47 denotes a second bearing. Reference numeral 51 denotes an electric EGR valve. Reference numeral 52 denotes a position sensor. Reference numeral 53 denotes a linear solenoid. Reference numeral 54 denotes a valve mechanism.

The linear solenoid 53 includes: a vertically-movable armature 33 fit into an internal cylindrical space formed with respective inner peripheral walls of first and second stators 36, 37 and the coil 40 disposed between the lower and upper stators 36, 37; and the first return spring 34 biasing the armature 33 upward. The first bearing 46 is fit into a center of the first stator 36. The shaft 38 is supported by the bearing 46 to be vertically slidable and movable integrally with the armature 33 with an upper end of the shaft 38 secured to a center of armature 33.

A lower end of the shaft 38 is formed into the valve 39. In the valve base 41 of the valve mechanism 54, the recirculation passage 42 for exhaust gas is formed. The valve seat 43 is positioned at a midpoint of passage 42 within valve base 41, and the valve 39 provided at the lower end of the shaft 38 is seated on and unseated from the valve seat 43 to selectively close and open.

The shaft 1 supported in vertically movable protrudes into a center of the linear solenoid 53 with a lower end of the shaft 1 contacting with the armature 33.

The second return spring 35 biases the shaft 1 including the first magnet 2 mounted thereto downward and is held by the inner cover 44. The inner cover 44 and an electrical connecting portion between the relay terminal 21 and the connector terminal 24 are covered with the outer cover 45.

In FIG. 2, an axis of the shaft 1 is parallel to the first polarity vector 2a of the first magnet 2. The second magnet 3 is disposed opposite to the first magnet 2. The first and second polarity vectors 2a, 3a cross to each other substantially at right angles three-dimensionally. The first and second magnetic flux collecting yokes 4a, 4b each made of a magnetic sheet are disposed over opposed sides of second magnet 3, respectively, and are disposed perpendicularly to the second polarity vector 3a of-the second magnet 3. The first and second semiconductor magnetoresistive elements 5a, 5b are disposed over respective sides of the yokes 4a, 4b. A magnetosensitive axis of the first and second magnetoresistive elements 5a, 5b is orthogonal to the first and second polarity vectors 2a, 3a. The first and second magnetoresistive elements 5a, 5b and first and second fixed resistors 6a, 6b are electrically connected to form a Wheatstone bridge.

Regarding dimensions of the essential parts shown in FIG. 2, the second magnet 3 has a length along the second polarity vector 3a of 4 mm, a length in parallel with the shaft 1 of 5 mm, and a length perpendicular to the shaft 1 of 4 mm. Each of the first and second yokes 4a, 4b has a thickness of 10 mm. The first magnet 2 has an outside diameter of $\phi$8 mm and an axial length of 12 mm. The distance between an outer peripheral surface of the first magnet 2 and a surface of the first magnetoresistive element 5a as well as the distance between the outer peripheral surface of the first magnet 2 and a surface of the second magnetoresistive element 5b is 2.8 mm.

In FIG. 3, the first magnet 2 is made of resin paste including the SmCo rare earth magnet and is insert-molded into a pipe 1a. A projection 1b provided at the pipe 1a prevents the pipe from getting out. The pipe 1a is press-fit to the shaft 1.

In FIG. 4, the first and second semiconductor magnetoresistive elements 5a, 5b are die-bonded to the lead frame 19, and electrodes (not shown) disposed over magentoresistive elements 5a, 5b are wire-bonded to the lead frame 19 by a gold wire 17. These components are subjected to transfer molding, so that molded case 18 is formed over the first and second magnetic flux collecting yokes 4a, 4b and the second magnet 3. The lead frame 19 is electrically coupled to the relay terminal 21 via the relay board 20. These components are covered with a sealing resin 22. As shown in FIG. 1, the relay terminal 21 is electrically connected to the connector terminal 24, and connector 25 outputs a signal.

An operation in accordance with the present embodiment will be hereinafter described.

In the electric EGR valve 51, a current input from a control ECU (not shown) to the coil 40 varies, the shaft 38 moves accordingly. Consequently, an opening of the valve 39 as well as an amount of exhaust gas recirculated varies accordingly. Simultaneously, the moving shaft 38 moves the shaft 1 of the position sensor 52, and the first magnet 2 mounted to the shaft 1 moves accordingly. This changes a strength of a magnetic field applied to the first and second magnetoresistive elements 5a, 5b disposed over the respective sides of the yokes 4a, 4b disposed over the respective opposed sides of the second magnet 3 perpendicularly to the second polarity vector 3a of the second magnet 3 opposite to the first magnet 2. The variance of the magnetic field strength get respective resistances of the magnetoresistive elements 5a, 5b to vary. The Wheatstone bridge formed with the first and second magnetoresisitive elements 5a, 5b and the first and second fixed resistors 6a, 6b converts the resistance changes into a change in voltage.

Figure 5:
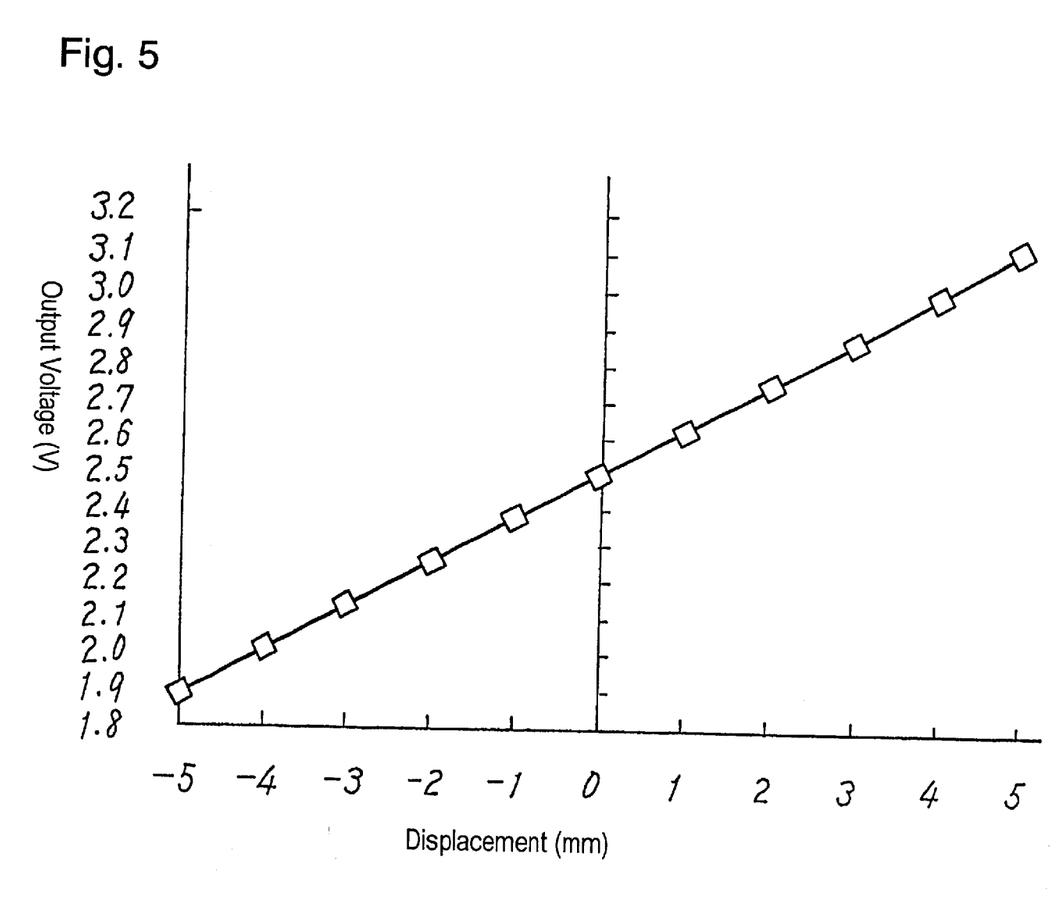
FIG. 5 illustrates an output characteristic of the position sensor in accordance with the embodiment.

FIG. 5 illustrates an output of the position sensor 52 described in above. The horizontal axis of FIG. 5 represents a displacement of the first magnet 2 about a reference center of the second magnet 3 in a parallel direction with the shaft 1 of the second magnet 3, and the vertical axis represents an output voltage of the position sensor 52. The output voltage varies linearly with the displacement of the first magnet 2. When the displacement changes from −5 mm to +5 mm, the output voltages ranges in a large value, 1V or more.

The moving amount of the shaft 38 corresponds to the opening of the valve 39, and the detected opening is fed back to the ECU for control. The movement of the shaft 38 is restricted by the armature 33 including the shaft 38 secured thereto, and the first and second bearings 46, 47. In other words, the valve 39 is located at a fully-closing position (corresponding to a displacement of +4 mm in FIG. 5) when the armature 33 contacts with the bearing 47, and is located at a fully-opening position (corresponds to a displacement of −4 mm in FIG. 5) when the armature 33 contacts with the bearing 46.

Figure 6:
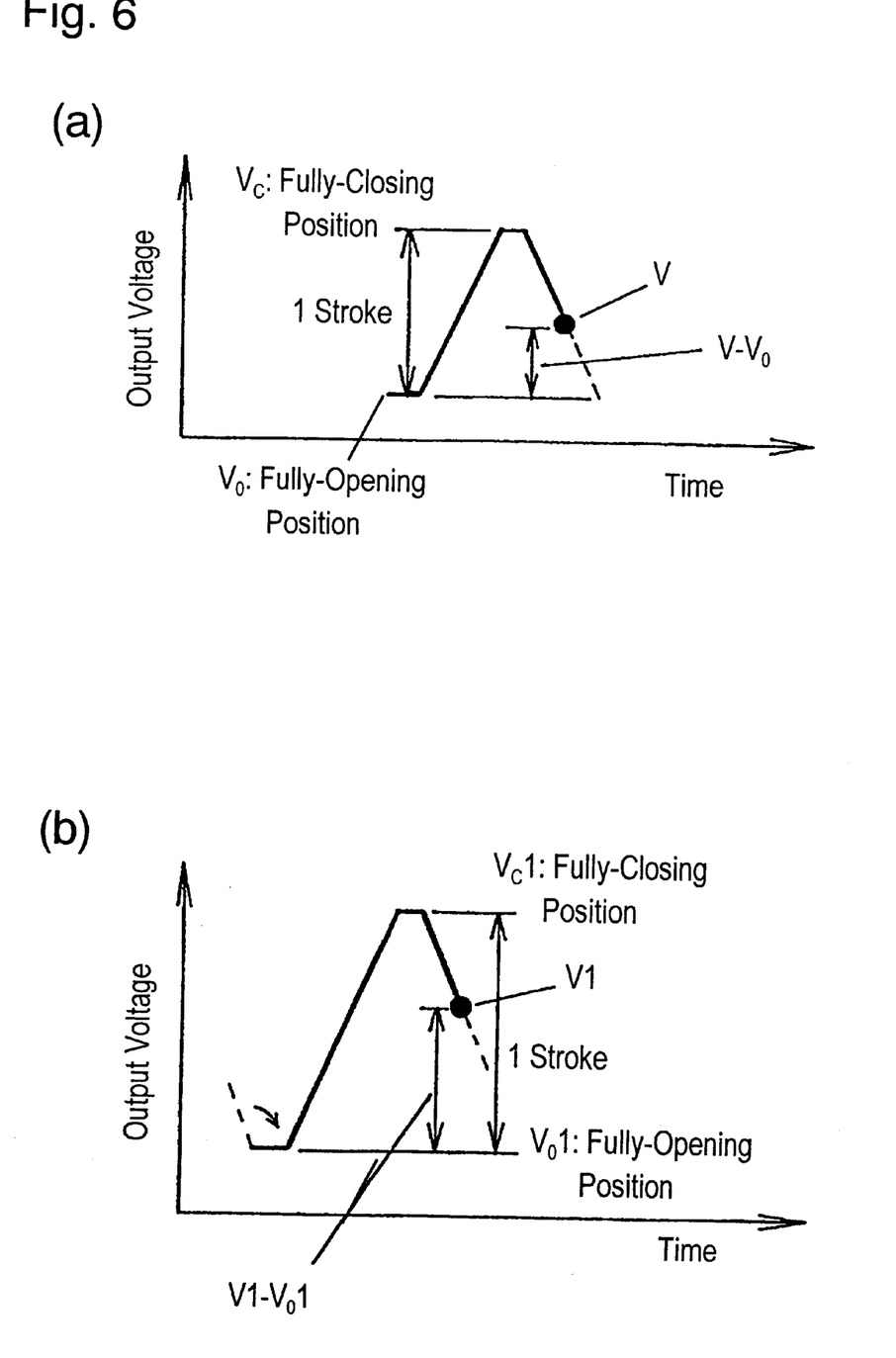

A relationship between such operating pattern and the output voltage is shown schematically in FIG. 6(a). In FIG. 6(a), reference symbol Vc denotes an output voltage (corresponding to 3.0V in FIG. 5) representing the fully-closing position, reference symbol Vo denotes an output voltage (corresponding to 2.0V in FIG. 5) representing the fully-opening position, and reference symbol V denotes the present output voltage.

A present actual valve position X based on FIG. 6(a) can be expressed as:

$$X = \frac{(V - Vo) \times 1stroke}{Vc - Vo}$$

With the above-mentioned configuration, a temperature drift of the output voltage resulting from a temperature change occurs as shown in FIG. 6(b). In FIG. 6(b), reference symbol Vc1 denotes an output voltage representing the fully-closing position after the temperature drift, reference symbol Vo1 denotes an output voltage representing the fully-opening position after the temperature drift, and reference symbol V1 denotes the present output voltage after the temperature drift.

Even if the temperature changes, the present actual valve position X can be obtained by the equation:

$$X = \frac{(V1 - Vo1) \times 1stroke}{Vc1 - Vo1}$$

In the present embodiment, the first and second magnets 2, 3 and the first and second magnetic flux collecting yokes 4a, 4b basically form a substantially-closed magnetic circuit hardly affected by an external magnetic field.

In this embodiment, the distance between the outer peripheral surface of the first magnet 2 and the surface of the first semiconductor magnetoresistive element 5a as well as a distance between the outer peripheral surface of the first magnet 2 and the surface of the second semiconductor magnetoresistive element 5b is 2.8 mm. However, the distance ranging from 2.5 mm to 3.1 mm ensures the same effect.

In this embodiment, the position sensor 52 is provided independently upon the linear solenoid 53 and valve mechanism 54. This facilitates replacing the position sensor 52 having an problem even during being manufactured. Also, even if the shaft 1 rotates about its axis, the sensor detects the position accurately. This is because the first magnet 2 is cylindrical and coaxial with the shaft 1, and the space between the first and second magnetoresistive elements 5a, 5b remains invariable. Further, the sensor detects the position accurately since the first and second magnets 2, 3 employs the SmCo rare earth magnet hardly having a magnetic force hardly changing due to the temperature change or due to a decline of durability.

According to the present embodiment, an amplifier for the output of the position sensor 52 is not employed. However, the output may come out through the amplifier. This is applicable to cases where a processor in the subsequent stage requires a signal voltage reaching a specified or higher input level. The amplifier may be an AC amplifier. The AC amplifier is applicable to detecting the position of the shaft 1 moving at a specified or higher frequency. Thus, the system has an advantage that the temperature drift affecting the first and second semiconductor magnetoresistive elements 5a, 5b can be cancelled for more accurate detection.

A bare chip, functioning as the amplifier, and the first and second semiconductor magnetoresistive elements 5a, 5b may be packaged into one by being die-bonded to the lead frame 19 and wire-bonded by a gold wire 17. Consequently, the wiring between the first and second magnetoresistive elements 5a, 5b and the bare chip is reduced, thus improving noise immunity. In addition, a circuit board can have a reduced area since requiring little external circuitry, thus allowing the sensor to be small.

In the present embodiment, the electric EGR valve to which the position sensor is applied is described. However, the position sensor of the present invention is applicable to various devices each including a solenoid-valve-driving device and the like employing an electromagnetic actuator.

In the solenoid-valve-driving device, the valve and the valve seat wear due to a repeated use over a long period of time, so that the seating position of the fully-closing valve changes. Even in this case, the device, upon monitoring the output voltage of the position sensor at the fully-closing position, utilizing the voltage as information useful for diagnosis.

In the present embodiment, the semiconductor magnetoresistive elements is used as a magnetoelectric transducer, but the magnetoelectric transducer is not limited to it, and may employ, for example, a Hall element.

In this embodiment, the magnetic flux collecting yokes 4a, 4b each made of a sheet made of the magnetic material are disposed over the respective opposed sides of the second magnet 3 and disposed perpendicularly to the second polarity vector 3a. The first and second semiconductor magnetoresistive elements 5a, 5b is disposed over the respective sides of the yokes 4a, 4b with the magnetosensitive axis of the elements 5a, 5b substantially orthogonal to the first and second polarity vectors 2a, 3a. However, the present invention is not limited to this example. For example, the first and second semiconductor magnetoresistive elements 5a, 5b functioning as the magnetoelectric transducer may be disposed over the second magnet 3 with respective magnetosensitive axis thereof substantially orthogonal to the first and second polarity vectors 2a, 3a. In this case, it is preferable that each of first and second magnetoresistive elements 5a, 5b is disposed over an end of the second magnet 3 for its output sensitivity.

INDUSTRIAL APPLICABILITY

According to the present invention, as explained above, a position sensor for an electromagnetic actuator detects a position accurately with no contact, while not restricting the rotation of a shaft thereof to be detected about the axis of the shaft at all.

| Reference Numerals | |
|---|---|
| 1 | Shaft To Be Detected |
| 1a | Pipe |
| 1b | Projection |
| 2 | First Magnet |
| 2a | First Polarity Vector |
| 3 | Second Magnet |
| 3a | Second Polarity Vector |
| 4a | First Magnetic Flux Collecting Yoke |
| 4b | Second Magnetic Flux Collecting Yoke |
| 5a | First Semiconductor Magnetoresistive Element |
| 5b | Second Semiconductor Magnetoresistive Element |
| 6a | First Resistor |
| 6b | Second Resistor |
| 17 | Gold Wire |
| 18 | Molded Case |
| 19 | Lead Frame |
| 20 | Relay Board |
| 21 | Relay Terminal |
| 24 | Connector Terminal |
| 25 | Connector |
| 33 | Armature |
| 34 | First Return Spring |
| 35 | Second Return Spring |
| 36 | First Stator |
| 37 | Second Stator |
| 38 | Shaft |
| 39 | Valve |
| 40 | Coil |
| 41 | Valve Base |
| 42 | Recirculation Passage |
| 43 | Valve Seat |
| 44 | Inner Cover |
| 45 | Outer Cover |
| 46 | First Bearing |
| 47 | Second Bearing |
| 51 | Electric EGR Valve |
| 52 | Position Sensor |
| 53 | Linear Solenoid |
| 54 | Valve Mechanism |

What is claimed is:

1. A position sensor for an electromagnetic actuator, comprising:

a shaft to be detected moving axially in synchronization with a movable shaft of the electromagnetic actuator;

a first magnet fixed to said shaft, said first magnet having a first polarity vector parallel with an axis of said shaft;

a second magnet disposed opposite to said first magnet, said second magnet having a second polarity vector substantially orthogonal to said first polarity vector; and a magnetoelectric transducer disposed between said first and second magnets, said magnetoelectric transducer having a magnetosensitive axis substantially orthogonal to said first and second polarity vectors;

wherein said magnetoelectric transducer generates an output responsive to an axial movement of said shaft.

2. The position sensor of claim 1, wherein said first magnet is cylindrical and coaxial with said axis of said shaft to be detected.

3. The position sensor of claim 1, wherein said magnetoelectric transducer includes first and second semiconductor magnetoresistive elements disposed over said second magnet and aligned in parallel with said second polarity vector.

4. The position sensor of claim 3, further comprising an amplifier provided between said first and second semiconductor magnetoresistive elements.

5. The position sensor of claim 1, wherein each of said first and second magnets made of SmCo rare earth magnet.

6. The position sensor of claim 1, wherein said shaft to be detected is made of non-magnetic material.

7. A position sensor for an electromagnetic actuator, comprising:

a shaft to be detected moving axially in synchronization with a movable shaft of the electromagnetic actuator;

a first magnet fixed to said shaft, said first magnet having a first polarity vector parallel with an axis of said shaft;

a second magnet disposed opposite to said first magnet, said second magnet having a second polarity vector substantially orthogonal to said first polarity vector;

two magnetic flux collecting yokes disposed on respective opposed sides of said second magnet and disposed perpendicularly to said second polarity vector, said magnetic flux collecting yokes being made of magnetic material; and magnetoelectric transducers disposed at respective sides of said magnetic flux collecting yokes and between said first and second magnets, said magnetoelectric transducers each having a magnetosensitive axis substantially orthogonal to said first and second polarity vectors, wherein said magnetoelectric transducers generate outputs responsive to an axial movement of said shaft.

8. The position sensor of claim 7, wherein said magnetoelectric transducers include first and second semiconductor magnetoresistive elements disposed over said respective sides of said magnetic flux collecting yokes, said first and second semiconductor magnetoresistive elements being aligned in parallel with said second polarity vector.

* * * * *